(12) United States Patent
Gilbert et al.

(10) Patent No.: US 6,896,378 B2
(45) Date of Patent: May 24, 2005

(54) EXTERNAL VEHICLE MIRROR AND METHOD FOR MANUFACTURE

(75) Inventors: Robert William Gilbert, Willunga (AU); Gary Gordon Leslie Fimeri, Morphett Vale (AU); Paul Michael Schwarz, Colonel Light Gardens (AU); Patrick Joseph McCaffrey, O'Halloran Hill (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 28 days.

(21) Appl. No.: 10/297,538

(22) PCT Filed: Jun. 5, 2001

(86) PCT No.: PCT/AU01/00664

§ 371 (c)(1),
(2), (4) Date: Dec. 5, 2002

(87) PCT Pub. No.: WO01/94154

PCT Pub. Date: Dec. 13, 2001

(65) Prior Publication Data

US 2003/0128446 A1 Jul. 10, 2003

(51) Int. Cl.$^7$ .............................. G02B 5/08; G02B 7/18
(52) U.S. Cl. ......................... 359/841; 248/479; 248/900
(58) Field of Search ................................ 359/841, 870, 359/871, 872; 248/475.1, 476, 479, 549, 900

(56) References Cited

U.S. PATENT DOCUMENTS 3,408,136 A * 10/1968 Travis ........................ 359/864
4,174,823 A * 11/1979 Sutton et al. ................ 248/582
4,256,375 A * 3/1981 Sharp .......................... 359/877
6,382,804 B1 * 5/2002 Lang et al. .................. 359/872
6,390,634 B1 * 5/2002 Lang et al. .................. 359/871
6,416,191 B1 * 7/2002 Lang et al. .................. 359/841

FOREIGN PATENT DOCUMENTS

| CA | 2198267 A1 | 8/1998 |
| DE | 28 20 883 A1 | 11/1979 |
| DE | 44 29 604 A1 | 2/1996 |
| DE | 25 37 876 A1 | 3/1997 |
| FR | 2 633 568 A1 | 1/1990 |
| WO | WO 00/46072 A | 8/2000 |

* cited by examiner

*Primary Examiner*—Mark A. Robinson
(74) *Attorney, Agent, or Firm*—Warn, Hoffmann, Miller & LaLone, P.C.

(57) ABSTRACT

This invention relates to a mirror head (10) for an external vehicle mirror that comprises a load carrying structure (11) that is located within the mirror head, a connector (16) on the load carrying structure (11) that connects the mirror head (10) with respect to the vehicle, a shell (12, 13, 14) forming the external surface of the mirror head (10) within which at least a portion of the load carrying structure (11) locates, said connector (16) being positioned to enable connection with respect to the vehicle, and foam within the internal cavity of the shell (12, 13, 14), that acts to bond the load carrying structure (11) with respect to the shell components (12, 13, 14). This assembly provides a lighter mirror head (10) by comparison to conventional construction techniques while at the same time remaining rigid. It provides a means whereby loads can be transferred to the foam which are in turn transferred to the external shell components (12, 13, 14) of the mirror head (10).

17 Claims, 5 Drawing Sheets

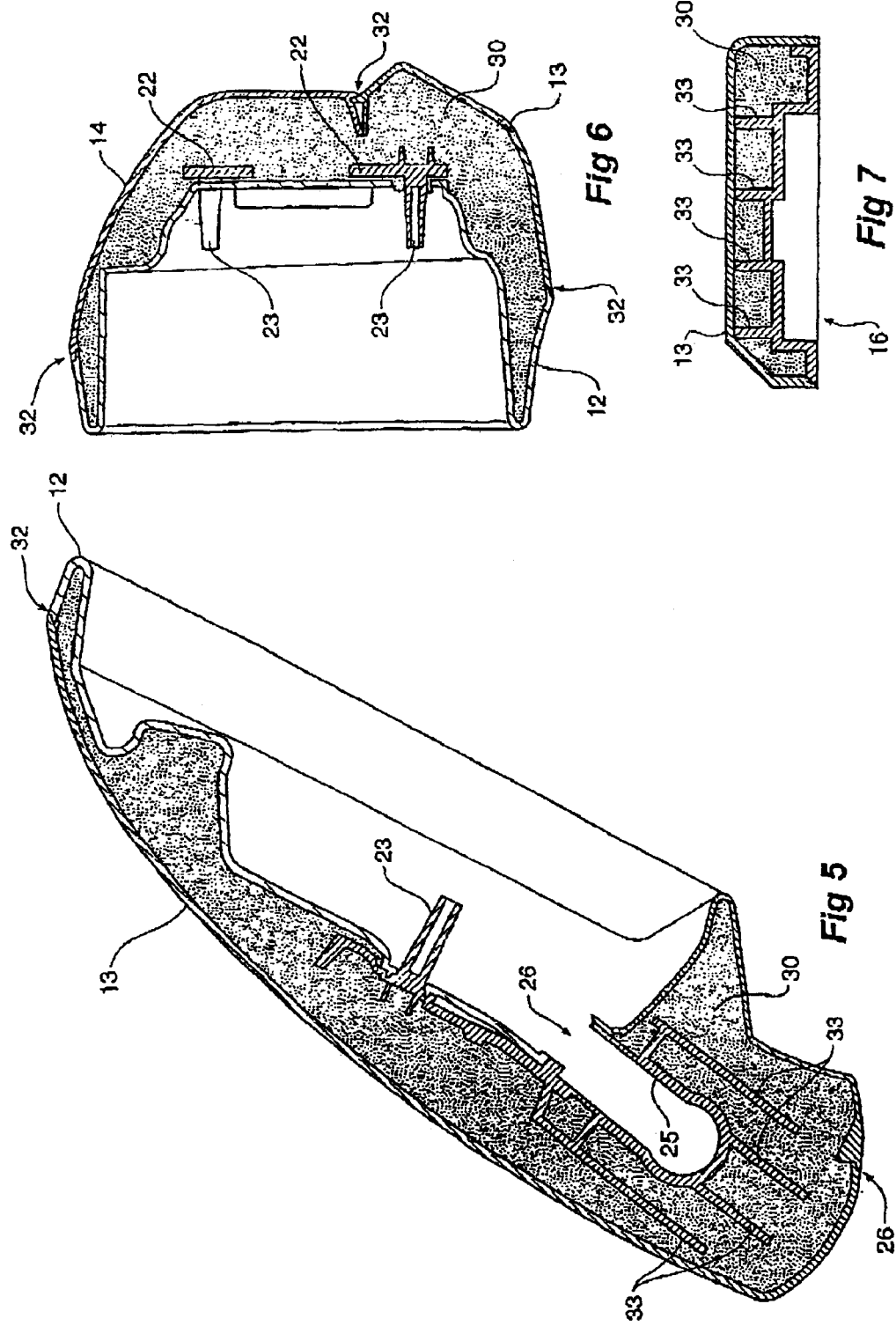

EXTERNAL VEHICLE MIRROR AND METHOD FOR MANUFACTURE

CROSS-REFERENCE TO RELATED APPLICATIONS

The instant patent application claims priority to International Patent Application PCT/AU01/00664 filed Jun. 5, 2001, and Australian Patent Application No. PQ7949 filed Jun. 5, 2000, the entire specifications of which are expressly incorporated herein by reference.

FIELD OF THE INVENTION

The present invention relates generally to an internal vehicle mirror, and more particularly to a specific assembly and method of manufacture of such a mirror.

BACKGROUND

The invention disclosed in the abovementioned International Application PCT/AU00/00054 used a thin molded external plastic shell in conjunction with a foam core to form a mirror housing or mirror head. This construction had the advantage of being light and inexpensive to manufacture. The thinner external shell resulted in decreased weight and reduced cost and the use of a foam core provided the required strength and rigidity expected of mirror heads molded from thicker materials.

The present invention describes improvements for the design and manufacture of foam filled components and aims to produce a mirror head that is light and has a low cost of manufacture.

SUMMARY OF THE INVENTION

In its broadest form, the present invention is a mirror head for an external vehicle mirror that comprises:

a load carrying structure that is located within said mirror head, a connector on said load carrying structure that connects said mirror head with respect to said vehicle, a shell forming the external surface of said mirror head within which at least a portion of said load carrying structure locates, said connector being positioned to enable connection with respect to said vehicle, and foam within the internal cavity of said shell that acts to bond said load carrying structure with respect to said shell.

The use of a load carrying structure enables the incorporation of a connection which provides a means of securing the mirror head to either a motor vehicle or mounting bracket. Connection may comprise a pivot connection or a means of attaching a pivoting mechanism. The load carrying structure embeds within the foam and provides sufficient adhesion to the foam to transfer forces from the mirror head to the connector when force is applied to the mirror head such as when the mirror head is manually rotated. Preferably it also provides a spine or frame to which the mirror head and the remainder of the components such as motor drives and mirror plates are attached. These components may be attached directly to the load carrying structure or alternatively may be connected via parts of the external shell which adhere to the internal foam.

The connection portion of the load carrying structure is positioned so that the required connection to a pivot can be achieved. Either the connection is external to the shell or a cut-away or recess is provided in the shell that allows access to the connection.

The load carrying structure may include a plastic molded component that has a frame-like construction. That is, the portion that is within the shell comprises a number of interconnected struts that assist in transferring load but provide a means of incorporating attachment points for other mirror components such as electric servo-motor assemblies.

The external shell may comprise a unitary molding with an opening to allow insertion of the bed carrying structure. Alternatively, two or more components may be assembled to form the shell prior to filling with foam.

The shell may comprise components that are of a reduced thickness by comparison to existing moldings. The thickness would be such that, in an unsupported form, the shell could be depressed or flexed with even quite light pressure. Portions of the shell could also be a film-like material that simply provides a covering for the foam.

If more than one component is used to construct the mirror shell, the components may have varying thickness by comparison to one another. For example, a component located in an area which may be subject to more impact damage could be made thicker than other components.

Application of the foam is preferably achieved by pouring a liquid foam material into one half of the mirror and then assembling the other half and holding them together before the foam expands.

When cured, the foam bonds to the internal surfaces of the shell to secure and support them. It also bonds and keys to the load carrying structure. This process holds the assembly together and provides the required rigidity to the shell components which would otherwise be too soft by themselves and deform under light pressure.

Alternatively, the foam is injected into the internal cavity once the load carrying structure and external shell are assembled. In a further alternative, a pre-molded foam core or cores may be used.

In order to fully understand the invention as described above, a preferred embodiment will now be described. However, it should be realised that the scope of the embodiment described does not restrict the invention to the precise detail of the embodiment.

BRIEF DESCRIPTION OF THE DRAWINGS

FIG. 5 shows a cross-sectional view of an assembled mirror head in FIG. 4 about section line 5—5, FIG. 6 shows a cross-sections view of a mirror head shown in FIG. 4 about section line 6—6, and FIG. 7 shows a cross-sectional view of the connection portion of the load carrying structure of an assembled mirror head as seen in FIG. 4 about section line 7—7.

DESCRIPTION OF PREFERRED EMBODIMENTS

Figure 1:
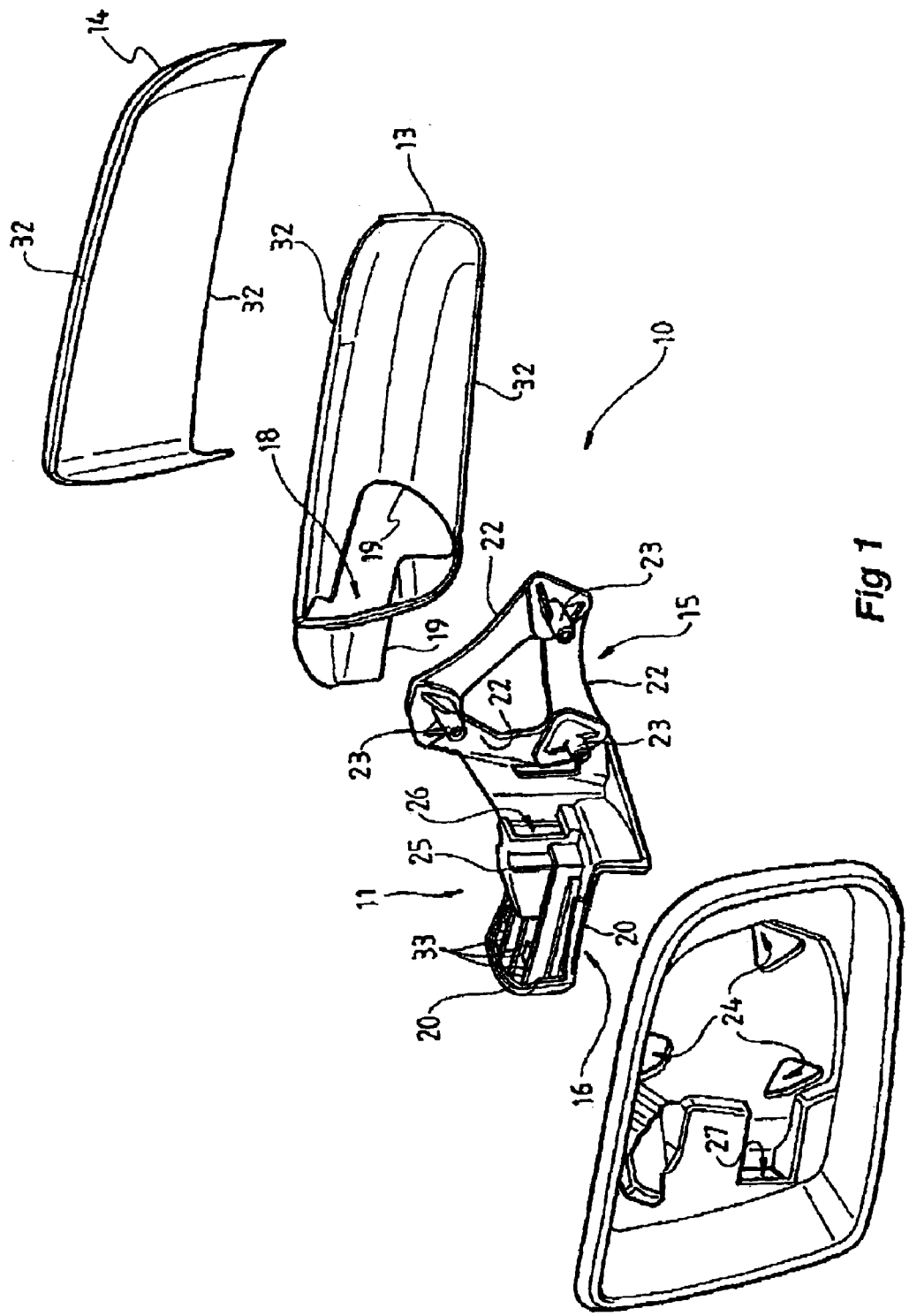
FIG. 1 shows an exploded view of a mirror head according to the invention.
Figure 2:
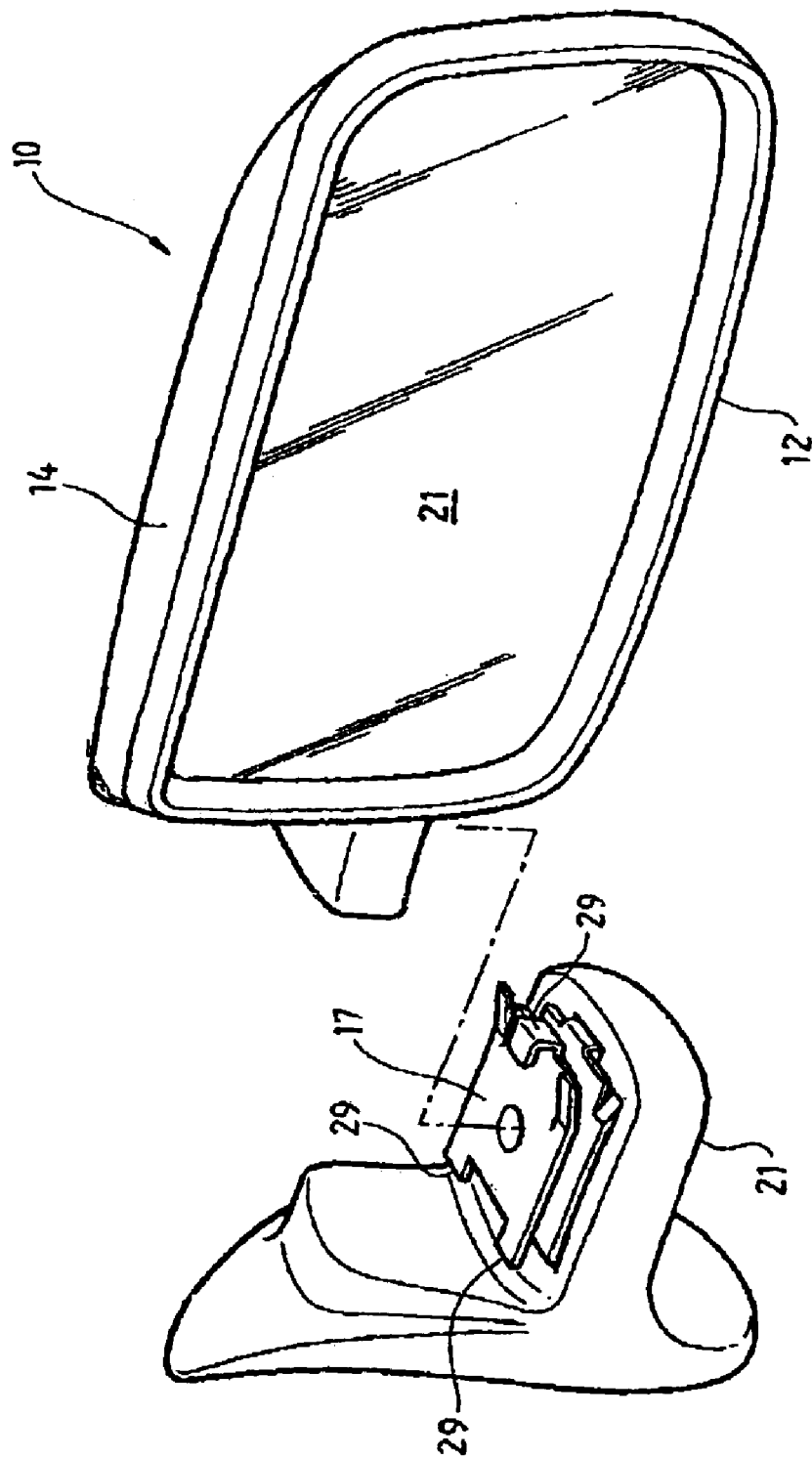
FIG. 2 shows an assembled mirror head, mounting bracket and a pivot mechanism attached to the mounting bracket.
Figure 3:
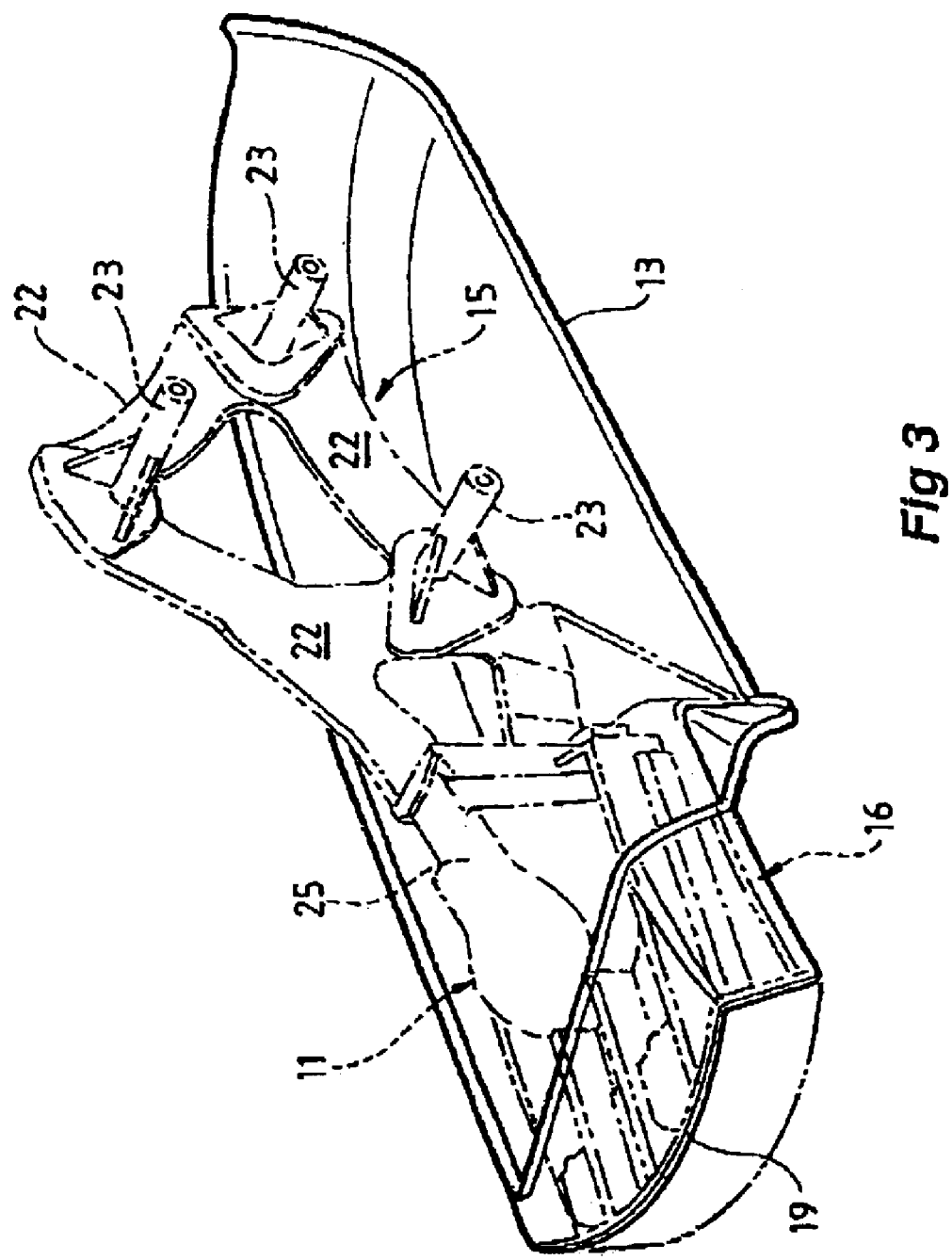
FIG. 3 shows a load carrying structure and associated frame assembled to a lower shell.
Figure 4:
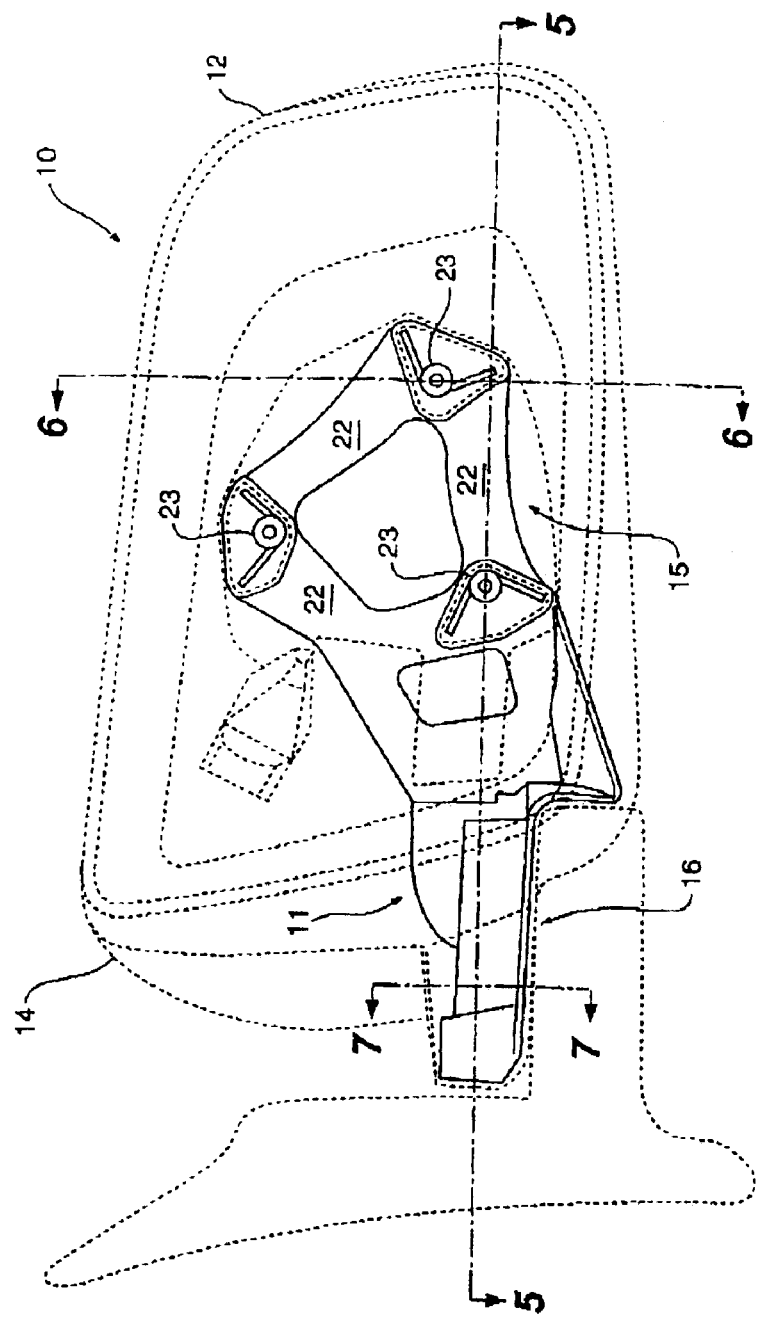
FIG. 4 shows a mirror head attached to a mounting bracket in ghost outline with a load carrying structure and frame shown in solid outline.

Referring to FIG. 1, the mirror head assembly 10 comprises a load carrying structure 11 and a series of external shell components 12 to 14. The first component is a shell front plate 12. The other two components are a lower shell 13 and an upper shell 14.

The load carrying structure comprises a frame portion 15 and a connector that in this embodiment comprises a socket 16. The socket 16 locates within an opening 18. The edge 19 of the opening 18 is shaped so that it matches the edge 20 of the socket 16. This means that the socket 16 is accessible for connection to a pivoting component 17. In this embodiment, the head assembly 10 is to be connected with respect to a vehicle via the pivoting component 17. Preferably, that connection is via a mounting bracket 21 which is in turn attached to the vehicle. A pivoting component 17 is used between the mirror head 10 and the mounting bracket 21. The pivoting component 17 can be of the type shown in International Application No AU00/00068 titled "A Pivot With A Detent". The disclosures of this specification are incorporated within this specification in its entirety. For example, the specification shows a manually operated pivot connection as well as an electrically operated mechanism which enables power folding or moving of the mirror head to a park position when the vehicle is stationary. Moving the mirror head towards the vehicle, which is referred to as the park position, minimises the width of the vehicle which is a desirable attribute in narrow streets.

The socket 16 has apertures as described in International Application No. AU00/00068 which enable the pivot 17 to be clipped to the socket 16. The pivot 17 is provided with upstanding portions 29 which locate and clip into the apertures provided within the socket 16.

Alternatively, a spigot mechanism the same as that shown in U.S. Pat. No. 5,432,640 titled "Spigot-type Breakaway Mirror" may be used with the present invention. The disclosure of this U.S. specification is herein incorporated by reference in its entirety to this specification.

Further, power fold mechanisms such as those shown in Australian Patent Application No. 68997/98 titled "A Mirror Operating Mechanism" and International Patent Application No. AU00/00009 titled "A Mirror Rotation Mechanism" may be incorporated into the invention. The disclosures of both of these specifications are hereby incorporated by reference in their entirety to this specification. Both of these specifications disclose the use of electric motors and gear mechanisms to move the mirror head to a parked position. They also incorporate override clutch mechanisms which enable manual movement of the mirror head.

The frame portion 15 comprises interconnected struts 22 which are positioned within the cavity formed by the assembly of the front plate 12 and the lower and upper shells 13 and 14.

The load carrying structure 11 is a molded component and the struts 22 have spigots 23 which are used for mounting the electric servo-motor assembly using threaded fasteners. The mirror plate 21 is in turn pivotally secured to this assembly and its position adjusted by the servo-motors. The spigots 23 locate through apertures 24 in the front plate 12. The front plate 12 is a concave plastic molding where the recess portion is shaped to allow location of electric servo-motor assembly in the mirror head 10 so that it is positioned behind a mirror plate 21 which also locates within the concave portion.

The load carrying structure 11 has a conduit 25 that has an opening 26. The front cover 12 has a cover portion 27 that aligns with the conduit 25 and extends from at least the opening 26 and over the frame portion 15. The combination of the conduit 25 and the cover 27 result in a conduit that remains free of foam 30 when the mirror head 10 is filled with foam 30. This provides access for electrical wiring to the electric servo-motors mounted in the front plate 12. Alternative arrangements for forming such a conduit might comprise an elongate tubular form molded into the load carrying structure 11, or one half of a conduit molded on the load carrying structure 11 with the remaining half molded on the front plate 12.

The edges of the shell components 12, 13 and 14 have inter-engaging flanges 32 that provide a foam tight seal between the abutting edges. This prevents the foam 30 leaking through abutting edges and creating an unsightly appearance that would require rework.

In this embodiment, the lower shell 13 can be a slightly thicker section than the upper shell 14. This greater thickness provides increased rigidity and also provides greater impact resistance which will be required for this area of the mirror head 10.

To assemble the mirror head, the load carrying structure 11 is positioned within the lower shell 13. The front plate 12 and upper shell 14 are placed in a position and held together in a cradle during the foam injection process. The foam 30 is poured into one of these halves before they are clamped together. The foam 30 is allowed to partially set before release of the assembly from the cradle. The resultant product is lighter than conventional manufacturing processes while at the same time resulting in a rigid assembly. The load carrying structure 11 allows rigid mounting of the mirror head 10 to a mounting bracket and also assists in transferring the load from force applied to the mirror head to the pivot allowing rotation of the mirror head about a mounting bracket.

The mirror head is designed to have electric motors mounted within the cavity formed by the front plate 12 in the head 10. A suitable motor assembly is shown in Australian Patent No. 652078 titled "Discrete Mirror Drive Assembly" and the disclosures of this specification are incorporated within this specification in their entirety. The mirror drive assembly shown in this specification provides a pair of motors which are secured within the mirror head 10. It provides a means of pivotally connecting a mirror plate to the mirror head 10 and the motors provide the necessary movement of the mirror about horizontal and vertical axes to allow the driver of a vehicle to adjust the mirror plate to a desired position.

It is a design requirement of external vehicle wing mirrors that they have sufficient strength to withstand certain loads. One requirement is in relation to vertical loads that are applied to the mirror head 10. This is described in International Patent Application No. AU00/00815. The disclosure of this specification is incorporated herein in its entirety. This specification shows a design of enabling the wing mirror to withstand high cantilever loads which result from force being applied vertically to the outermost edge of the mirror head 10. The design shown in this specification prevents damage being caused to the pivot and pivot connections.

International Patent Application No. AU00/00054 titled "Vehicle External Mirror Housing And Method Of Manufacture" describes methods used to incorporate the foam into a mirror head 10. The disclosures in this specification are incorporated herein in their entirety. In particular, the specification discloses methods of forming shell or scalp components with edges designed to interlock so as to prevent leakage of foam from these joints during the foaming process. Further, techniques and methods of introducing foam into the mirror head 10 are described.

International Patent Application No. AU00/00413 titled "Method Of Producing A Plastic Moulded Part Including A Film Covering" describes a method of molding the external shell components for a mirror head 10. The disclosures in this specification are hereby incorporated within this specification in their entirety. The specification shows a method of molding a shaped thin plastic component incorporating a colored external film. This particular method is extremely useful in forming the thin external covers that comprise the shell elements of the mirror head 10.

It would be possible to also incorporate other components within the mirror head 10 described in this specification. Such components include electronic sensors such as proximity sensors to determine if the mirror head is close to an obstruction, sensors that sense external temperature and humidity, and sensors incorporated with the car security system such as motion detectors. Other various electronic equipment may be incorporated in the mirror head such as lights used to light the area around the vehicle, or lights that may be controlled from within the vehicle that enables the light to be moved to provide directional lighting, speakers and microphones used to communicate to people external of the vehicle, antennas for various apparatus such as mobile phones, GPS devices and other radio communication devices. In addition, transmitters may be incorporated into the mirror head which are used for controlling external objects such as garage doors or providing radio transmissions which may be used, for example, to track or locate the vehicle. Other electronic devices such as automatic toll payment systems or remote transaction systems may be incorporated into the mirror head to enable electronic registration of toll payments.

Cameras may be incorporated into the mirror head which are both forward and rearward looking which are designed to continuously capture digital images and to store those images either on command or as a result of an accident. Motion sensors can be used to determine the occurrence of the accident so that the images before and after the event are stored.

It will be apparent from the above description that the invention provides a unique combination of components that provides a rigid yet light mirror head assembly. However, the invention is not to be confined to this specific combination and other inventive combinations will be apparent from the above description.

What is claimed is:

1. A mirror head for an external vehicle mirror, comprising:
    a load carrying structure that is located within said mirror head;
    a connector on said load carrying structure that connects said mirror head to said vehicle so that the mirror head is pivotably mounted to the vehicle;
    a shell having a plurality of pieces that fit together and form the external surface of said mirror head within which at least a portion of said load carrying structure locates, said connector being positioned to enable connection to said vehicle; and
    foam within the internal cavity of said shell that acts to bond said load carrying structure to said shell so that a force applied to the shell causes the mirror head to pivot relative to the vehicle, wherein one side of the load carrying structure is free of foam within the internal cavity to provide an open area for electrical wiring.

2. A mirror head for an external vehicle mirror according to claim 1 wherein said foam fills the internal cavity of said shell.

3. A mirror head for an external vehicle mirror according to claim 1 wherein said shell comprises a unitary molding.

4. A mirror head for an external vehicle mirror according to claim 1 wherein said shell comprises a front plate and rear upper and lower back plates.

5. A mirror head for an external vehicle mirror according to claim 1 wherein said load carrying structure comprises comprises a planar element attached to said connector that is located within said mirror head.

6. A mirror head for an external vehicle mirror according to claim 1 wherein said load carrying structure comprises a plurality of struts attached to said connector to form a frame that is located within said mirror head.

7. A mirror head for an external vehicle mirror according to claim 6 wherein said frame is planar.

8. A mirror head for an external vehicle mirror according to claim 6 wherein said frame is substantially triangular.

9. A mirror head for an external vehicle mirror according to claim 6 further comprising spigots on said frame that enable components of said mirror head to be mounted thereto.

10. A mirror head for an external vehicle mirror according to claim 1 wherein said connector is operable for attaching to a pivot on a mounting bracket where said mounting bracket is secured to said vehicle.

11. A mirror head for an external vehicle mirror according to claim 10 wherein said connector locates within an aperture in said shell.

12. A mirror head for an external vehicle mirror according to claim 1 further comprising a conduit in said shell and load carrying structure to locate electrical wiring from outside said mirror head to within said mirror head.

13. A mirror head for an external vehicle mirror, comprising:
    a shell that forms an external surface of said mirror head, said shell comprising a front portion and a rear portion;
    an area defining an aperture formed in said shell;
    a load carrying structure located within said shell that attaches to said front portion;
    a connector on said load carrying structure that is located adjacent said aperture in said shell that connects said mirror head to said vehicle so that the mirror head is pivotably mounted to the vehicle; and
    foam within the internal cavity of said shell that acts to bond said front and rear portion of said shell together and also to said load carrying structure so that a force applied to the shell causes the mirror head to pivot relative to the vehicle, wherein one side of the load carrying structure is free of foam within the internal cavity to provide an open area for electrical wiring.

14. A mirror head for an external vehicle mirror according to claim 13 wherein said rear portion comprises an upper rear portion and a lower rear portion.

15. A mirror head for an external vehicle mirror according to claim 13 further comprising a conduit in said shell and load carrying structure to locate electrical wiring from outside said mirror head to within said mirror head.

16. A mirror head for an external vehicle mirror according to the claim 13 wherein said front portion of said shell has a recess in its external surface into which a mirror plate locates.

17. A mirror head for an external vehicle mirror according to claim 16 comprising further recesses for locating electric motors for attachment to and position adjustment of said mirror plate.

* * * * *

UNITED STATES PATENT AND TRADEMARK OFFICE
CERTIFICATE OF CORRECTION

PATENT NO. : 6,896,378 B2  
DATED : May 24, 2005  
INVENTOR(S) : Robert William Gilbert et al.

It is certified that error appears in the above-identified patent and that said Letters Patent is hereby corrected as shown below:

<u>Title page,</u>  
Item [75], Inventors, "Gary Gordon" should be -- Garry Gordon --.

<u>Column 2,</u>  
Line 8, "the bed carrying" should be -- the load carrying --.  
Line 54, "a cross-sections view" should be -- a cross-sectional view --.

<u>Column 3,</u>  
Line 10, "the head assembly" should be -- the mirror head assembly --.

<u>Column 4,</u>  
Line 35, "head 10" should be -- mirror head 10 --.

<u>Column 6,</u>  
Line 7, "structure comprises comprises a" should be -- structure comprises a --.

Signed and Sealed this

Thirteenth Day of September, 2005

JON W. DUDAS  
*Director of the United States Patent and Trademark Office*